United States Patent
Lin

(10) Patent No.: US 8,264,625 B2
(45) Date of Patent: Sep. 11, 2012

(54) DISPLAY DEVICE AND METHOD OF DISPLAYING THREE DIMENSIONAL STEREOSCOPIC IMAGES

(75) Inventor: Hsiu-Hung Lin, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 640 days.

(21) Appl. No.: 12/542,698

(22) Filed: Aug. 18, 2009

(65) Prior Publication Data
US 2010/0302468 A1 Dec. 2, 2010

(30) Foreign Application Priority Data
May 26, 2009 (TW) ................................ 98117463 A

(51) Int. Cl.
G02F 1/1335 (2006.01)
(52) U.S. Cl. ........................................... 349/15; 349/95
(58) Field of Classification Search ................. 349/15, 349/95
See application file for complete search history.

(56) References Cited

U.S. PATENT DOCUMENTS
6,988,660 B2* 1/2006 Tsikos et al. .................. 235/454
7,933,056 B2* 4/2011 Tsao ........................... 359/211.3

FOREIGN PATENT DOCUMENTS
TW I222605 10/2004
* cited by examiner

Primary Examiner — Mike Qi
(74) Attorney, Agent, or Firm — Jianq Chyun IP Office

(57) ABSTRACT

A display device includes a first display panel, a second display panel, and an optical panel. The first display panel has a plurality of first display areas and provides a first frame. The second display panel has a plurality of second display areas and provides a second frame. The optical panel has a plurality of optical units with a zooming function. The first display areas and the second display areas are disposed corresponding to the optical units. The first frame is transformed into a first real image through the optical units. The second frame is transformed into a second real image through the optical units. There is a first depth of field between the first real image and the optical panel, and there is a second depth of field between the second real image and the optical panel. The first depth of field differs from the second depth of field.

14 Claims, 7 Drawing Sheets

DISPLAY DEVICE AND METHOD OF DISPLAYING THREE DIMENSIONAL STEREOSCOPIC IMAGES

CROSS-REFERENCE TO RELATED APPLICATION

This application claims the priority benefit of Taiwan application serial no. 98117463, filed May 26, 2009. The entirety of the above-mentioned patent application is hereby incorporated by reference herein and made a part of specification.

BACKGROUND OF THE INVENTION

1. Field of the Invention

The present invention relates to a display device and a method of displaying three dimensional stereoscopic images, and more particularly, to a display device capable of adjusting the depth of field of images to enhance the stereoscopic visual sensation and a method of displaying three dimensional stereoscopic images.

2. Description of Related Art

With the advance of technology and the improvement of human lives, the demands for high image quality are correspondingly increasing. For example, a display device is improved for obtaining images with high definition, and in addition, many researches tend to provide a stereoscopic display device which displays vivid images that achieve favorable visual sensation of presence.

FIG. 1 is a schematic view of an imaging method of a conventional stereoscopic display device. Referring to FIG. 1, the conventional stereoscopic display device 100 has a first display panel 110 and a second display panel 120. The first display panel 110 is disposed parallel to the second display panel 120, and a gap D is configured therebetween. Meanwhile, the second display panel 120 is located between a user P and the first display panel 110.

To allow the user P to view an image achieving a stereoscopic visual effect that brings about stereoscopic visual sensation of presence, the first display panel 110 and the second display panel 120 in the stereoscopic display device 100 respectively display a first frame F1 and a second frame F2, and the frames F1 and F2 displayed by the first display panel 110 and the second display panel 120 at the correspondingly same location have different brightness when the stereoscopic display device 100 displays the frames. For example, the brightness of the first frame F1 at a first location 112, a second location 114, and a third location 116 are respectively 10, 50, and 90, while the brightness of the second frame F2 at a first location 122, a second location 124, and a third location 126 are respectively 90, 50, and 10.

Owing to the characteristics of human eyes, the user P has the perception that distances of the images with different brightness are different, and therefore, the user P is capable of viewing a first stereoscopic image 132, a second stereoscopic image 134, and a third stereoscopic image 136 when the stereoscopic display device 100 displays the images. In particular, the user P has the perception that the first stereoscopic image 132 is the nearest to himself or herself, and the third stereoscopic image 136 is the farthest from himself or herself.

By using the stereoscopic display 100, the user P is capable of having the visual perception of stereoscopic images. However, the stereoscopic images displayed by the stereoscopic display device 100 must be located between the first display panel 110 and the second display panel 120. In other words, subject to a gap D between the first display panel 110 and the second display panel 120, the stereoscopic images that the user P views are restricted to be in a certain depth of field. Hence, the stereoscopic images displayed by the stereoscopic display device 100 is limited by the gap D, and the stereoscopic visual perception of the user P is hardly improved.

SUMMARY OF THE INVENTION

The present invention is directed to a display device capable of generating stereoscopic images without being limited by elements of the display device.

The present invention is also directed to a method of displaying three dimensional (3D) stereoscopic images, wherein the depth of field of the 3D stereoscopic images is adjustable according to demands of a user.

The present invention provides a display device including a first display panel, a second display panel, and an optical panel. The first display panel has a plurality of first display areas, and the first display panel provides a first frame. The second display panel has a plurality of second display areas, and the second display panel provides a second frame. The optical panel has a plurality of optical units with a zooming function. The optical panel is disposed parallel to the first display panel and the second display panel. There is a first gap between the first display panel and the optical panel, and there is a second gap between the second display panel and the optical panel. The second display panel is located between the first display panel and the optical panel, and the first display areas and the second display areas are configured corresponding to the optical units. The first frame is transformed into a first real image through the optical units, and the second frame is transformed into a second real image through the optical units. There is a first depth of field between the first real image and the optical panel, and there is a second depth of field between the second real image and the optical panel. The first depth of field is different from the second depth of field.

In an embodiment of the present invention, the optical units include a plurality of zooming lens.

In an embodiment of the present invention, the optical units are a plurality of liquid crystal lens units or a plurality of electrowetting lens units.

In an embodiment of the present invention, the first display panel is a liquid crystal display panel.

In an embodiment of the present invention, the second display panel is a liquid crystal display panel.

In an embodiment of the present invention, the first display panel includes a plurality of display pixels located in the first display areas, and there are several of the display pixels in each of the first display areas.

In an embodiment of the present invention, the second display panel includes a plurality of display pixels located in the second display areas, and there are several of the display pixels in each of the second display areas.

The present invention further provides a method of displaying 3D stereoscopic images including providing the above-mentioned display device, displaying the first frame through the first display panel, displaying the second frame through the second display panel, and adjusting a focus of the optical units, such that the first frame and the second frame are respectively transformed into the first real image and the second real image with the same size through the optical units. Particularly, the first depth of field and the second depth of field are changed together with image sizes of the first frame and the second frame.

In an embodiment of the present invention, when the image sizes of the first frame and the second frame are the same, the focus of the optical units is adjusted, such that the first depth of field is equal to the first gap, and the second depth of field is equal to the second gap. In an embodiment, the method of adjusting the focus of the optical units includes providing a first focus to the optical units when the first display panel displays the first frame and providing a second focus to the optical units when the second display panel displays the second frame. Here, the first focus is half the first gap, and the second focus is half the second gap. In addition, the method of displaying the 3D stereoscopic images further includes alternately displaying the first frame and the second frame on the first display panel and the second display panel.

In an embodiment of the present invention, when the image sizes of the first frame and the second frame are different, the focus of the optical units is adjusted, such that the size of the first real image is equal to the size of the second real image. In an embodiment, the first display panel and the second display panel display the first and the second frames at the same time. Besides, in a frame time at which the first display panel and the second display panel simultaneously display the first and the second frames, the focus of the optical units is constant. In addition, a difference between the first depth of field and the second depth of field is changed together with the image sizes of the first frame and the second frame.

In view of the above, the display device of the present invention is capable of modulating the imaging position of the stereoscopic images by adjusting the focus of the optical panel. Furthermore, the method of displaying the 3D stereoscopic images according to the present invention is appliable to displaying the 3D stereoscopic images with different depths of field, and thus the visual sensation of presence achieved by the 3D stereoscopic images is adjustable based on the demands of the user.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
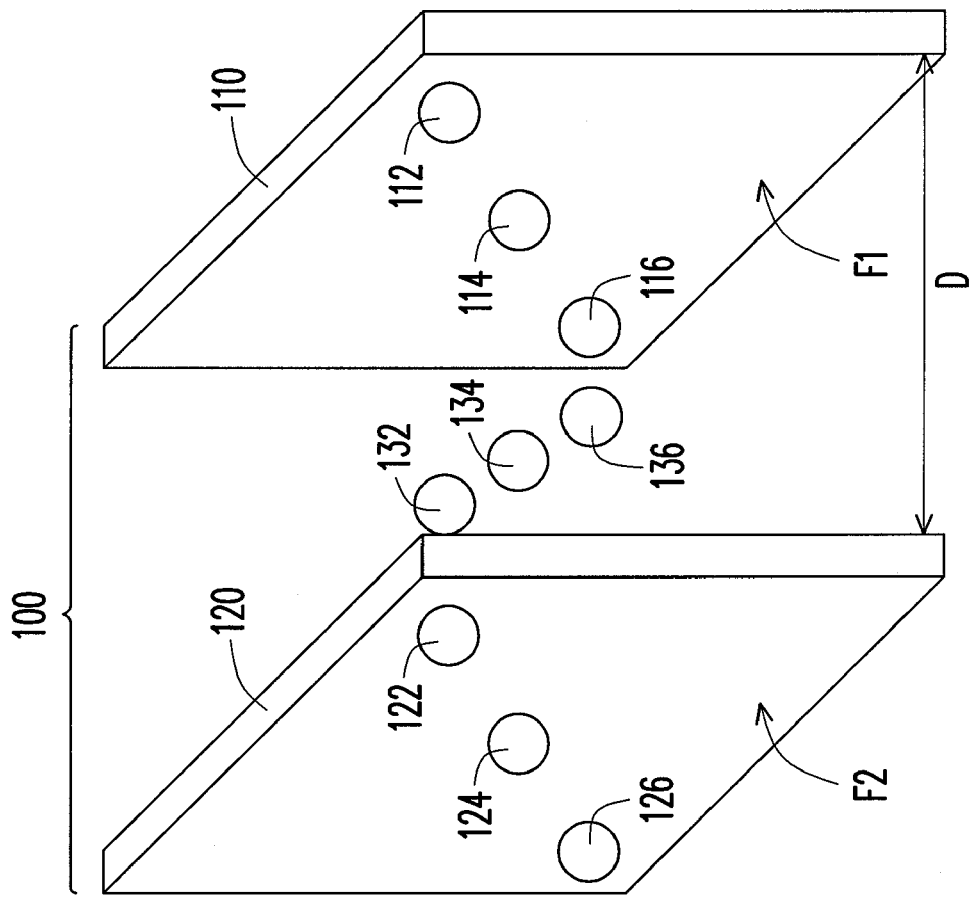
FIG. 1 is a schematic view of an imaging method of a conventional stereoscopic display device.
Figure 1:
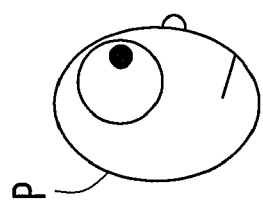
Figure 2:
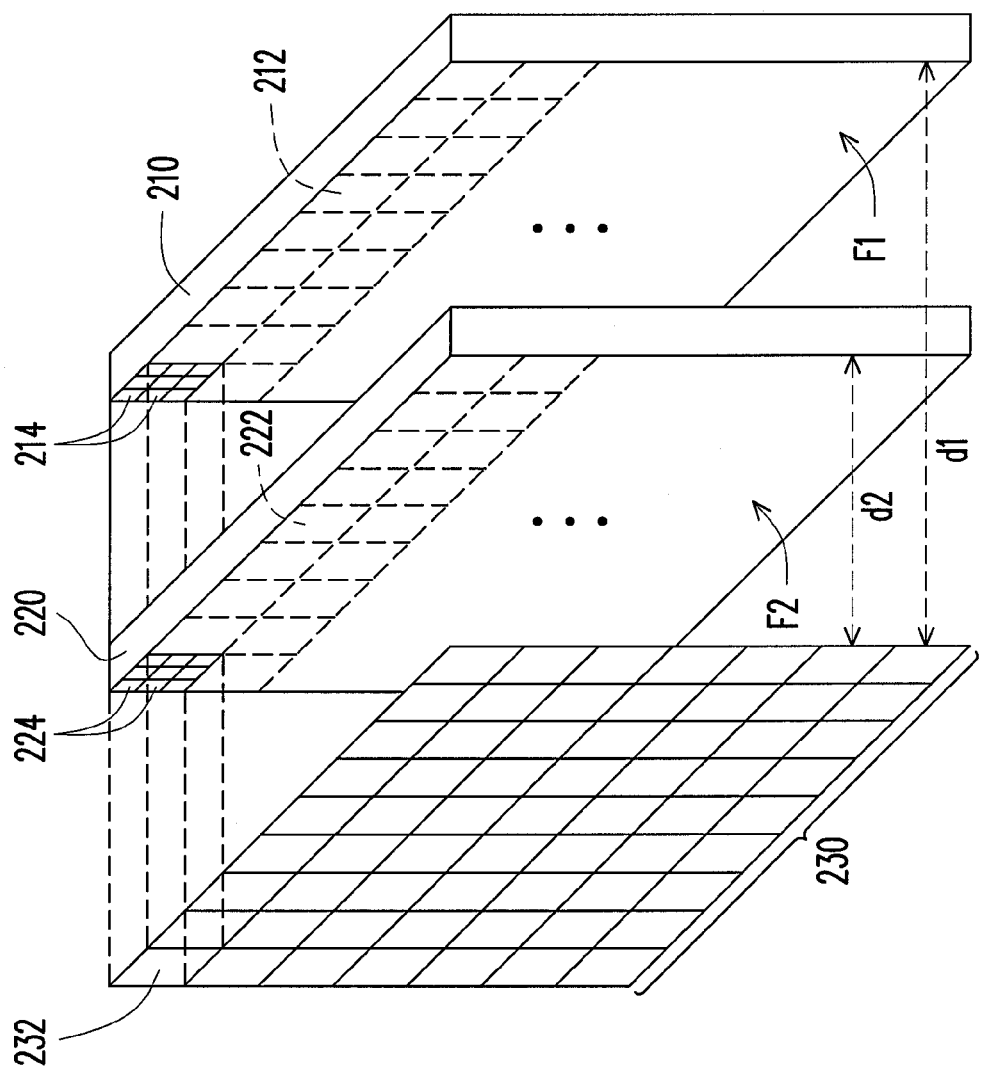
FIG. 2 is a schematic view of a display device according to an embodiment of the present invention.

FIG. 2 is a schematic view of a display device according to an embodiment of the present invention. Referring to FIG. 2, a display device 200 includes a first display panel 210, a second display panel 220, and an optical panel 230.

The first display panel 210 has a plurality of first display areas 212, and the first display panel 210 provides a first frame F1. In the present embodiment, the first display panel 210 is referred to as a liquid crystal display (LCD) panel (e.g. a transmissive display panel, a transflective display panel, a reflective display panel, a color-filter-on-array display panel, an array-on-color-filter display panel, a vertical alignment (VA) display panel, an in-plain switching (IPS) display panel, a multi-domain vertical alignment (MVA) display panel, a twisted-nematic (TN) display panel, a super twisted-nematic (STN) display panel, a patterned-slit vertical alignment (PVA) display panel, a super patterned-slit vertical alignment (S-PVA) display panel, an advanced super view (ASV) display panel, a fringe field switch (FFS) display panel, a continuous pinwheel alignment (CPA) display panel, an axially symmetric aligned micro-cell mode (ASM) display panel, an optically compensated bent (OCB) display panel, a super in-plane switching (S-IPS) display panel, an advanced super in-plane switching (AS-IPS) display panel, an ultra-fringe field switching (UFFS) display panel, a blue phase display panel, a polymer stabilized alignment display panel, a dual-view display panel, an electrophoretic display panel, or other display panels. Nevertheless, the above display panels are taken as examples, and the type of the first display panel 210 is not restricted in the present invention. In other embodiments, the first display panel 210 can be other types of display panel.

Moreover, in the display device 200, the first display panel 210, for example, includes a plurality of display pixels 214 located in the first display areas 212, and there are several of the display pixels 214 disposed in each of the first display areas 212. Herein, the first display areas 212 and the display pixels 214 shown in FIG. 2 are taken as examples, and the size of the first display areas 212 or the number of the display pixels 214 disposed in each of the first display areas 212 is not limited in the present invention.

Further referring to FIG. 2, in the display device 200, the second display panel 220 has a plurality of second display areas 222 and the second display panel 220 provides a second frame F2. In the present embodiment, the second display panel 220 is a liquid crystal display (LCD) panel. Similar to the first display panel 210 as described above, the second display panel 220 can be any type of display panel, which is not restricted in the present invention, and those of ordinary skill in the art can select the type of the second display panel 220 as required. In addition, the second display panel 220 also includes a plurality of display pixels 224 located in the second display areas 222, and there are several of the display pixel 224 disposed in each of the second display areas 222.

Similarly, the size of the second display areas 222 or the number of the display pixels 224 disposed in each of the second display areas 222 is not limited in the present invention. In different embodiments, the changes of the number of the display pixels 214 disposed in each of the first display areas 212 and the number of the display pixels 224 disposed in each of the second display areas 222 allow the display device 200 to display images with different qualities.

The above first display panel 210 and the second display panel 220 may be the same type of display panel or different types of display panels. In addition, the number of the display pixels 214 disposed in each of the first display areas 212 and the number of the display pixels 224 disposed in each of the second display areas 222 may be the same in the present embodiment but different in other embodiments.

Figure 3:
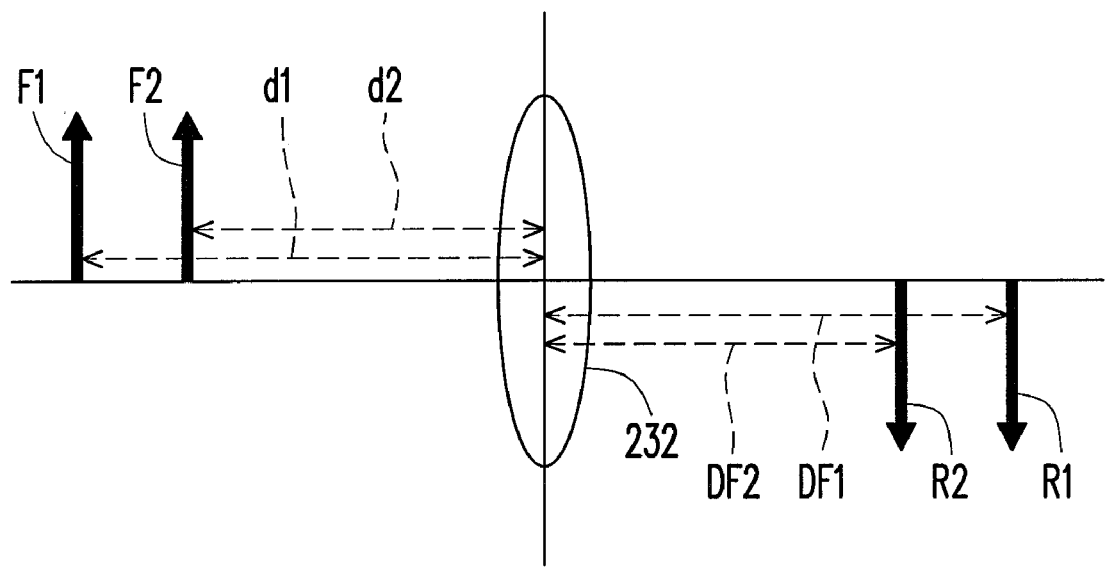
FIG. 3 is a schematic view of an imaging method of the display device in FIG. 2.

FIG. 3 is a schematic view of an imaging method of the display device in FIG. 2. Referring to FIG. 2 and FIG. 3 simultaneously, the display device 200 is configured with an optical panel 230, and in particular, the optical panel 230 has a plurality of optical units 232 with a zooming function which means that the focus is changeable.

The optical panel 230 is disposed parallel to the first display panel 210 and the second display panel 220. There is a first gap d1 between the first display panel 210 and the optical panel 230, and there is a second gap d2 between the second display panel 220 and the optical panel 230.

The second display panel 220 is located between the first display panel 210 and the optical panel 230, and the first display areas 212 and the second display areas 222 are configured corresponding to the optical units 232 as shown by dash lines in FIG. 2. For example, the first frame F1 is displayed by the first display panel 210 of the display device 200, and simultaneously, the focus of the optical units 232 is adjusted so as to transform the first frame F1 into a first real image R1. In addition, the second frame F2 is displayed by the second display panel 220 of the display device 200, and simultaneously, the focus of the optical units 232 is adjusted so as to transform the second frame F2 into a second real image R2. In particular, the sizes of the first real image R1 and the second real image R2 are the same, and a first depth of field DF1 and a second depth of field DF2 change together with the image sizes of the first frame F1 and the second frame F2.

Owing to the difference between the first depth of field DF1 and the second depth of field DF2, the display device 200 allows a user to have 3D stereoscopic visual perception. Specifically, as the difference between the first depth of field DF1 and the second depth of field DF2 increases, the 3D stereoscopic visual perception may be enhanced, and thus the user can have different visual sensations of presence.

It is noted that when more optical units 232 are used in the display device 200 to display images, the number of the display pixels 214 and 224 corresponding to each optical unit 232 is reduced. Accordingly, more of the optical units 232 with a reduced size can be used for displaying the stereoscopic images and further improving the display quality of the 3D stereoscopic images displayed by the display device 200. That is to say, the display resolution of the display device 200 can be enhanced.

In actual application of the display device 200, different operations can be selected to display 3D stereoscopic images, and some of the operations are discussed below.

Figure 4:
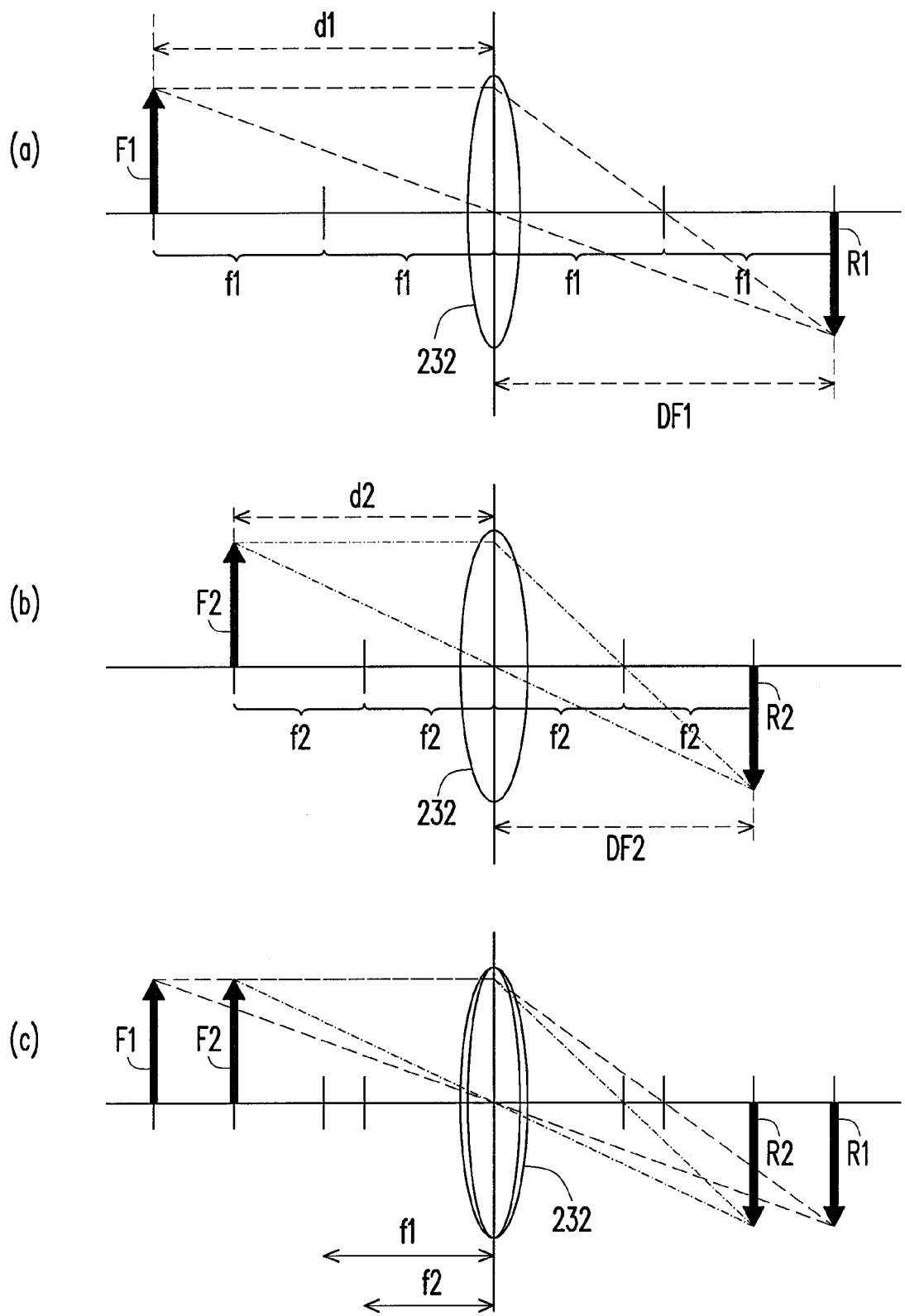
FIGS. 4(a)~(c) are schematic views of a method of displaying 3D stereoscopic images according to an embodiment of the present invention.

FIGS. 4(a)~(c) are schematic views of a method of displaying 3D stereoscopic images according to an embodiment of the present invention, wherein one single optical unit 232 is shown as an example. Referring to FIG. 2, FIG. 3, and FIGS. 4(a)~(c), when the image sizes of the first frame F1 and the second frame F2 are the same, the focus of the optical unit 232 is adjusted, such that the first depth of field DF1 is equal to the first gap d1, and that the second depth of field DF2 is equal to the second gap d2.

The method of adjusting the focus of the optical unit 232 includes providing a first focus f1 to the optical unit 232 when the first display panel 210 displays the first frame F1 as shown in FIG. 4(a) and providing a second focus f2 to the optical unit 232 when the second display panel 220 displays the second frame F2 as shown in FIG. 4(b). In particular, the first focus f1 is half the first gap d1, and the second focus f2 is half the second gap d2. In other words, the first gap d1 between the first frame F1 and the optical unit 232 is twice the first focus f1, and the second gap d2 between the second frame F2 and the optical unit 232 is twice the second focus f2.

As shown in FIG. 4(a), when the first display panel 210 displays the first frame F1, the first frame F1 is imaged at the position which is twice the focus away from the optical unit 232. Therefore, the first frame F1 located at one side of the optical unit 232 is transformed into the first real image R1 which has the same size as the first frame F1 and is located at the other side of the optical unit 232. Similarly, as shown in FIG. 4(b), when the second display panel 220 displays the second frame F2, the second frame F2 is imaged at the position which is twice the focus away from the optical unit 232. Therefore, the second frame F2 located at one side of the optical unit 232 is transformed into the second real image R2 which has the same size as the second frame F2 and is located at the other side of the optical unit 232.

In addition, in the present embodiment, the first display panel 210 and the second display panel 220 alternately display the first frame F1 and the second frame F2. That is to say, the second display panel 220 is turned off when the first display panel 210 displays the first frame F1, and the first display panel 210 is turned off when the second display panel 220 displays the second frame F2.

As shown in FIG. 4(c), when the switching frequency of the first display panel 210 and the second display panel 220 is so high that human eyes cannot detect the frequency, the user perceives the first real image R1 and the second real image R2 at the same time. Meanwhile, owing to the difference between the first depth of field DF1 and the second depth of field DF2, the user can perceive 3D stereoscopic images displayed by the display device 200.

It is worthy to note that the optical unit 232 of the present embodiment is designed with a zooming function, and thus the sizes of the first frame F1 and the second frame F2 may be the same. Accordingly, the displayed frames of the first display panel 210 and the second display panel 220 do not need additional adjustment, and thus loading of driving chips can be reduced.

Figure 5:
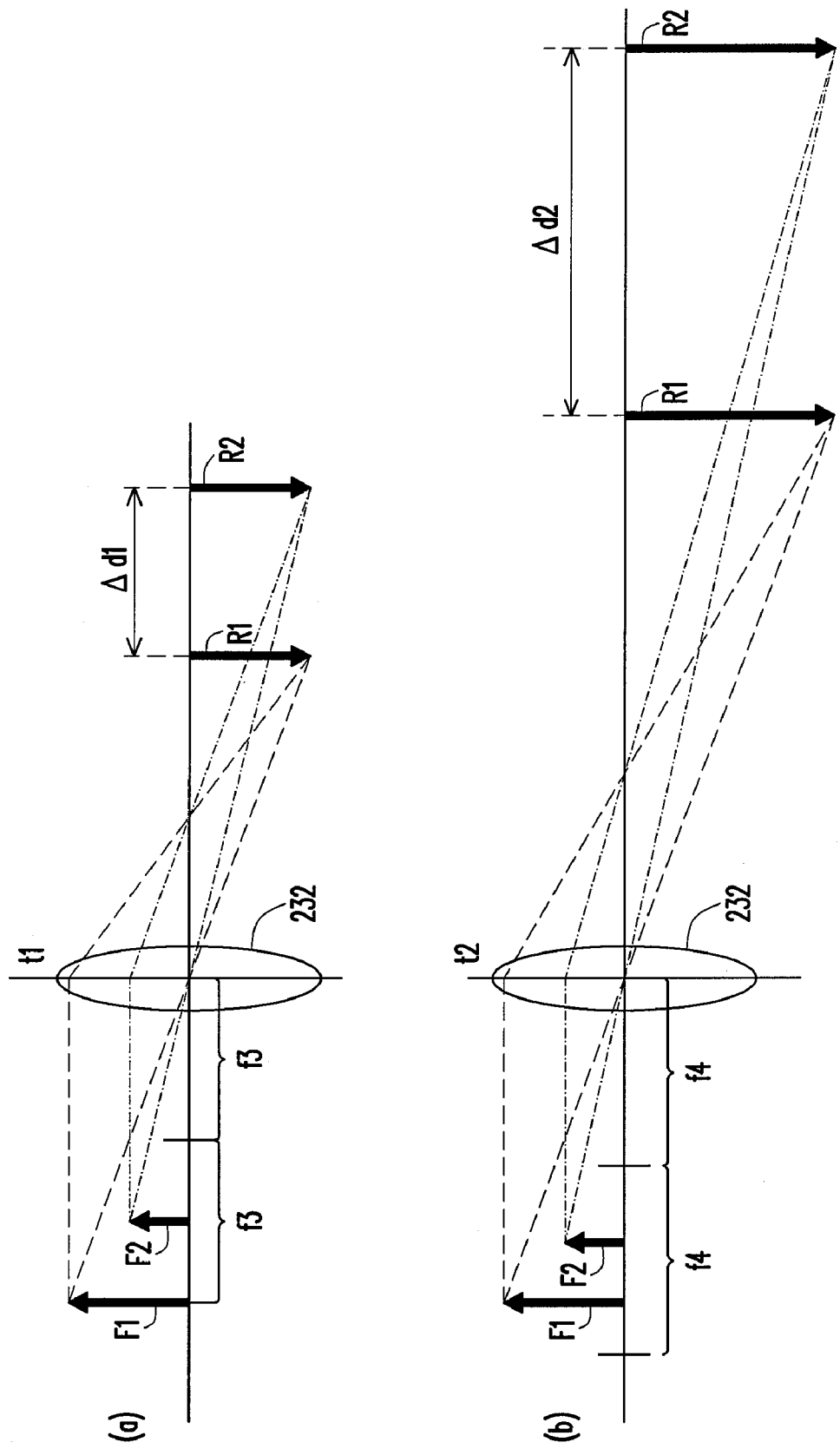
FIGS. 5(a)~(b) are schematic views of another method of displaying 3D stereoscopic images according to an embodiment of the present invention.

FIGS. 5(a)~(b) are schematic views of another method of displaying 3D stereoscopic images according to an embodiment of the present invention, wherein one single optical unit 232 is shown as an example. Referring to FIG. 2, FIG. 3, and FIGS. 5(a)~(b), in addition to the above method of displaying a 3D stereoscopic image, the present embodiment is further directed to a method in which the focus of the optical unit 232 can be adjusted to equalize the size of the first real image R1 and the second real image R2 when the image sizes of the first frame F1 and the second frame F2 are different.

As shown in FIG. 5(a), the first display panel 210 and the second display panel 220 of the display device 200 display the first and the second frames F1 and F2 simultaneously. To obtain the first real image R1 and the second real image R2 with the same size, the focus of the optical unit 232 is adjusted to a third focus f3. In a frame time t1 at which the first display panel 210 and the second display panel 220 simultaneously display the first and the second frames F1 and F2, the third focus f3 is, for example, constant. In addition, the difference between the first depth of field DF1 of the first real image R1 and the second depth of field DF2 of the second real image R2 is, for example, a first depth of field difference Δd1.

As shown in FIG. 5(b), in a frame time t2 at which the first display panel 210 and the second display panel 220 simultaneously display the first and the second frames F1 and F2, the image sizes of the first frame F1 and the second frame F2 are different from those in the frame time t1. Therefore, the focus of the optical unit 232 is adjusted to become a fourth focus f4 so as to obtain the first real image R1 and the second real image R2 with the same size. In the frame time t2, the fourth focus f4 is constant, and the difference between the first depth of field DF1 of the first real image R1 and the second depth of field DF2 of the second real image R2 is a second depth of field difference Δd2.

According to FIGS. 5(a)~(b), the first depth of field difference Δd1 and the second depth of field difference Δd2 change together with the image sizes of the first frame F1 and the second frame F2. Therefore, in different frame time t1 and t2, the user can perceive different stereoscopic images. That is to say, the focus of the optical unit 232 can be adjusted according to the variation of the image sizes of the first frame F1 and the second frame F2 in the present embodiment to generate the 3D stereoscopic images with different sizes and different depths of field.

By using the method of displaying 3D stereoscopic images mentioned above, the display device 200 in FIG. 2 is capable of displaying 3D stereoscopic images. Particularly, the variations of the depths of field of the 3D stereoscopic images can be enhanced through changing the focus of the optical units 232 with the zooming function and changing the image sizes of the first frame F1 and the second frame F2 in the above-mentioned embodiments. Accordingly, favorable display effects of the stereoscopic images can be achieved by using the display device 200.

More particularly, the above-mentioned optical units 232 have the zooming function, and the optical units 232 are constituted by a plurality of zooming lens units, for example. Specifically, the optical units 232 can be liquid crystal lens units as shown in FIGS. 6(a)~(b) or electrowetting lens units as shown in FIGS. 7(a)~(b).

Figure 6:
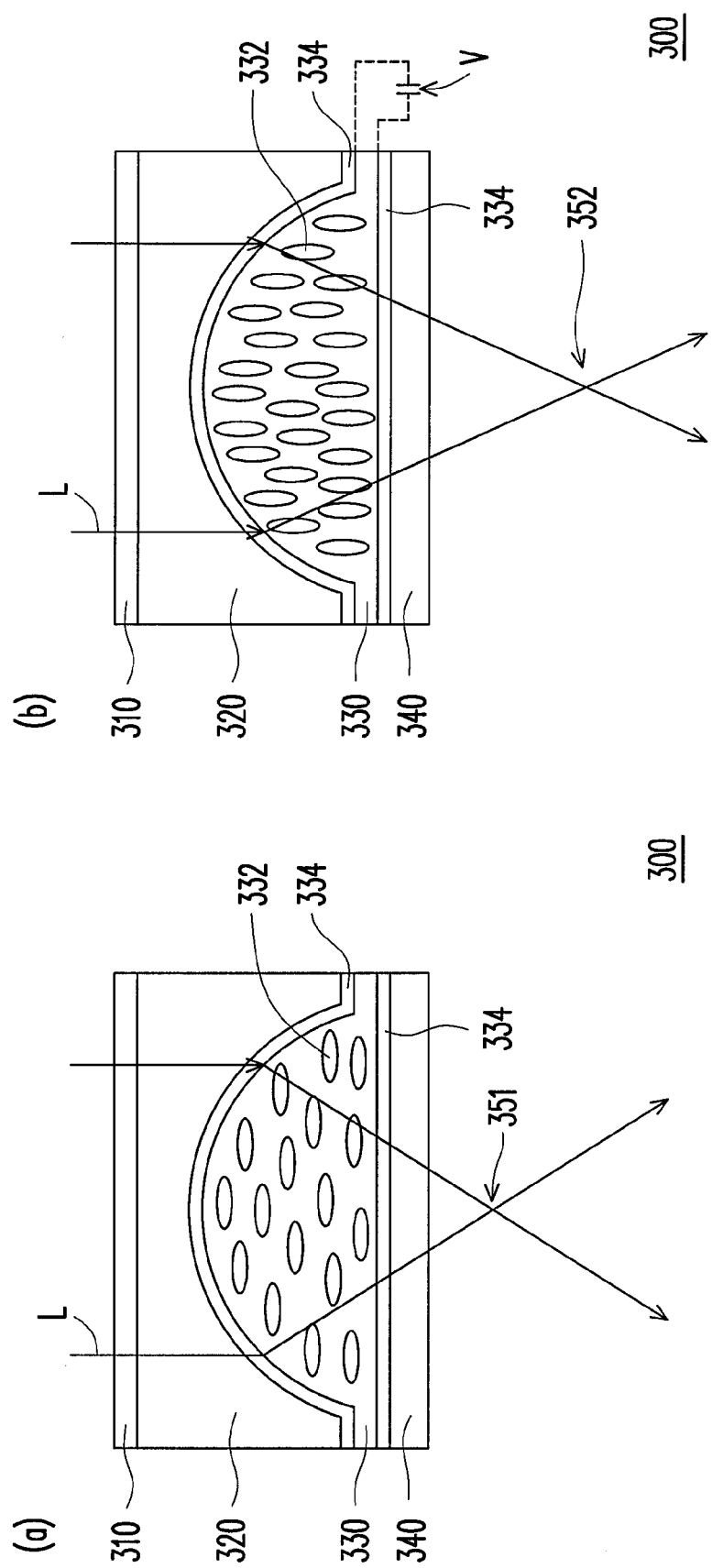
FIGS. 6(a)~(b) are schematic views of a liquid crystal lens unit according to an embodiment of the present invention.
Figure 7:
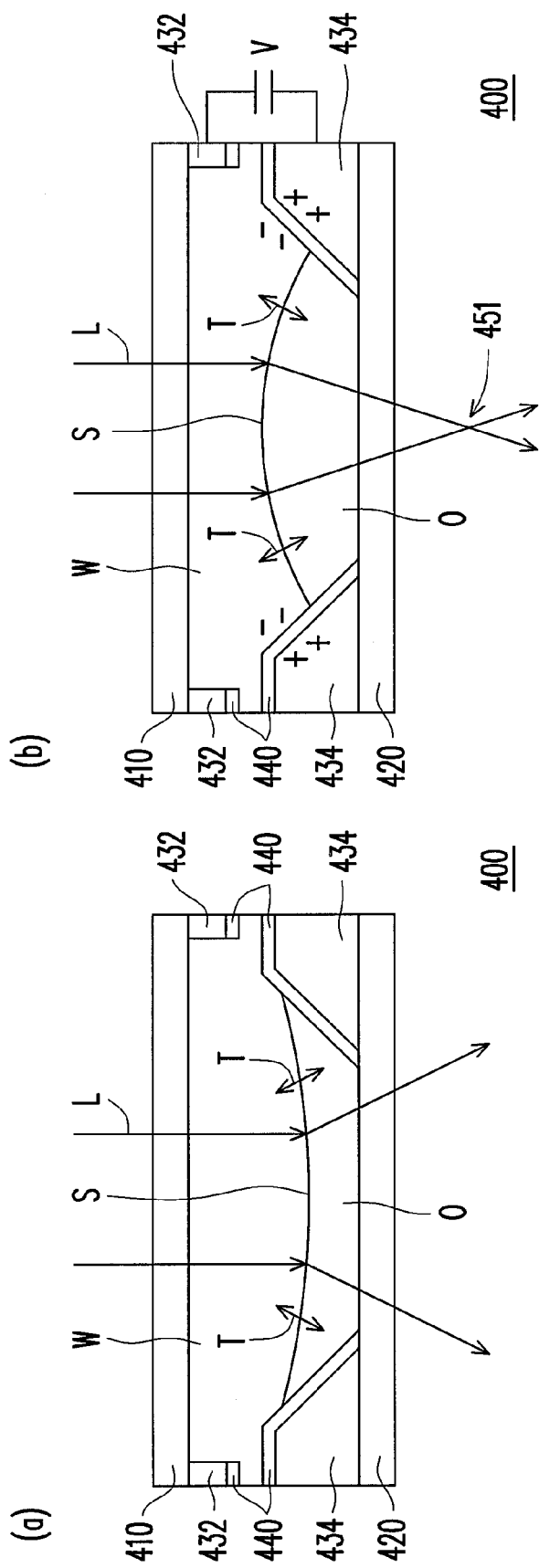
FIGS. 7(a)~(b) are schematic views of an electrowetting lens unit according to an embodiment of the present invention.

Referring to FIGS. 6(a)~(b), the liquid crystal lens unit 300 includes a polarizer 310, a first glass substrate 320, a second glass substrate 340, and a liquid crystal layer 330 disposed between the first glass substrate 320 and the second glass substrate 340. The liquid crystal layer 330 is composed of a plurality of liquid crystal molecules 332. In addition, the upper and bottom sides of the liquid crystal layer 330 are configured with transparent electrodes 334.

When the light L is incident to the liquid crystal lens unit 300, the light L first passes the polarizer 310 and has a certain polarized direction. Next, the light L further passes the first glass substrate 320, the liquid crystal layer 330, and the second glass substrate 340. Finally, owing to the optical properties of the liquid crystal molecules 332, the light L is focused on a focus point 351 outside the second glass substrate 340.

To change the focus of the liquid crystal lens unit 300, a voltage difference V is applied to the liquid crystal layer 330 as shown in FIG. 6(b). Generally, when the transparent electrodes 334 at the upper side and the bottom side of the liquid crystal layer 330 are supplied with the voltage difference V, the liquid crystal molecules 332 are tilted because of the influence of the voltage difference V. Meanwhile, the transmission direction of the light L is changed when the light L passes the liquid crystal layer 330. Therefore, the light L is focused on the focus point 352 outside the second glass substrate 340 but is not focused on the focus point 351 as shown in FIG. 6(a). In a word, the focus of the liquid crystal lens unit 300 can be changed by providing the voltage difference V to the liquid crystal layer 330 of the liquid crystal lens unit 300.

In addition, referring to FIGS. 7(a)~(b), an electrowetting lens unit 400 includes a first glass substrate 410, a second glass substrate 420, a first electrode 432, a second electrode 434, an insulating layer 440, a water layer W, and an oil layer O. The water layer W and the oil layer O are located between the first glass substrate 410 and the second glass substrate 420. An intersurface S between the water layer W and the oil layer O is a curved surface as shown in FIG. 7(a), and thus the light L passing the first glass substrate 410, the water layer W, and the oil layer O is scattered but is not focused.

To focus the light L and change the focus of the electrowetting lens unit 400, a voltage V is applied to the first electrode 432 and the second electrode 434. In the meantime, the surface tension T between the water layer W and the oil layer O is changed by the accumulation of the positive charges and the negative charges at the opposite sides of the insulating layer 440. Accordingly, the light L passing the intersurface S between the water layer W and the oil layer O can be focused on a focus point 451 outside the second glass substrate 420.

Therefore, the optical characteristics of the electrowetting lens unit 400 can be changed by providing the voltage V to the first electrode 432 and the second electrode 434. More particularly, the focus of the electrowetting lens unit 400 can be changed by controlling the value of the voltage V.

By using the liquid crystal lens unit 300 in FIGS. 6(a)~(b) or the erlectrowetting lens unit 400 in FIGS. 7(a)~(b), the optical units 232 can have the zooming function.

In view of the above, the display device of the present invention has optical units with the zooming function, and thus the display device is capable of displaying different 3D stereoscopic images by using different display frames. The method of displaying 3D stereoscopic images according to the present invention allows a user to perceive the 3D stereoscopic images with different depths of field when watching the images displayed by the display device. In addition, the imaging position of the stereoscopic images is not restricted, and thus the visual sensation of the user obtained by perceiving the 3D stereoscopic images can be modulated as required so as to obtain different 3D stereoscopic display effects.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device, comprising:
a first display panel having a plurality of first display areas, the first display panel providing a first frame;
a second display panel having a plurality of second display areas, the second display panel providing a second frame; and
an optical panel having a plurality of optical units with a zooming function, the optical panel being disposed parallel to the first display panel and the second display panel, wherein there is a first gap between the first display panel and the optical panel, and there is a second gap between the second display panel and the optical panel,
wherein the second display panel is located between the first display panel and the optical panel, the first display areas and the second display areas are disposed corresponding to the optical units such that the first frame is transformed into a first real image through the optical units and the second frame is transformed into a second real image through the optical units, there is a first depth of field between the first real image and the optical panel, there is a second depth of field between the second real image and the optical panel, and the first depth of field is different from the second depth of field.

2. The display device as claimed in claim 1, wherein the optical units comprise a plurality of zooming lens.

3. The display device as claimed in claim 2, wherein the optical units comprise a plurality of liquid crystal lens units or a plurality of electrowetting lens units.

4. The display device as claimed in claim 1, wherein the first display panel is a liquid crystal display panel.

5. The display device as claimed in claim 1, wherein the second display panel is a liquid crystal display panel.

6. The display device as claimed in claim 1, wherein the first display panel includes a plurality of display pixels located in the first display areas, and there are several of the display pixels in each of the first display areas.

7. The display device as claimed in claim 1, wherein the second display panel includes a plurality of display pixels located in the second display areas, and there are several of the display pixels in each of the second display areas.

8. A method of displaying three dimensional stereoscopic images, comprising:
   providing the display device as claimed in claim 1;
   displaying the first frame through the first display panel;
   displaying the second frame through the second display panel; and
   adjusting a focus of the optical units, such that the first frame and the second frame are respectively transformed into the first real image and the second real image with the same size through the optical units, wherein the first depth of field and the second depth of field are changed together with image sizes of the first frame and the second frame.

9. The method of displaying the three dimensional stereoscopic images as claimed in claim 8, wherein when the image sizes of the first frame and the second frame are the same, the focus of the optical units is adjusted, such that the first depth of field is equal to the first gap and the second depth of field is equal to the second gap.

10. The method of displaying the three dimensional stereoscopic images as claimed in claim 9, wherein the method of adjusting the focus of the optical units includes providing a first focus to the optical units when the first display panel displays the first frame and providing a second focus to the optical units when the second display panel displays the second frame, the first focus is half the first gap, and the second focus is half the second gap.

11. The method of displaying the three dimensional stereoscopic images as claimed in claim 10, further comprising alternately displaying the first frame and the second frame on the first display panel and the second display panel.

12. The method of displaying the three dimensional stereoscopic images as claimed in claim 8, wherein when the image sizes of the first frame and the second frame are different, the focus of the optical units is adjusted, such that the size of the first real image is equal to the size of the second real image.

13. The method of displaying the three dimensional stereoscopic images as claimed in claim 12, wherein the first display panel and the second display panel display the first and the second frames at the same time, and in a frame time at which the first display panel and the second display panel simultaneously display the first and the second frames, the focus of the optical units is constant.

14. The method of displaying the three dimensional stereoscopic images as claimed in claim 12, wherein a difference between the first depth of field and the second depth of field is changed together with the image sizes of the first frame and the second frame.

* * * * *